United States Patent
Johnson

(10) Patent No.: US 7,083,328 B2
(45) Date of Patent: Aug. 1, 2006

(54) REMOTE DIODE TEMPERATURE SENSE METHOD WITH PARASITIC RESISTANCE CANCELLATION

(75) Inventor: Jeffrey David Johnson, Tucson, AZ (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 10/912,733

(22) Filed: Aug. 5, 2004

(65) Prior Publication Data

US 2006/0029123 A1  Feb. 9, 2006

(51) Int. Cl.
*G01K 7/01* (2006.01)
(52) U.S. Cl. .................................................. 374/178
(58) Field of Classification Search .............. 374/178
See application file for complete search history.

(56) References Cited

U.S. PATENT DOCUMENTS

| | | | |
|---|---|---|---|
| 5,195,827 A | 3/1993 | Audy et al. ................ 374/172 |
| 6,097,239 A | 8/2000 | Miranda, Jr. et al. ....... 327/512 |
| 6,133,753 A | 10/2000 | Thomson et al. .............. 326/56 |
| 6,149,299 A * | 11/2000 | Aslan et al. ................. 374/178 |
| 6,169,442 B1 | 1/2001 | Meehan et al. .............. 327/513 |
| 6,188,189 B1 | 2/2001 | Blake .......................... 318/471 |
| 6,255,973 B1 | 7/2001 | Smith et al. ................. 341/141 |
| 6,332,710 B1 * | 12/2001 | Aslan et al. ................. 374/183 |
| 6,528,987 B1 | 3/2003 | Blake et al. ................. 324/168 |
| 6,554,470 B1 | 4/2003 | Zhang et al. ................ 374/178 |
| 6,637,934 B1 * | 10/2003 | Henderson et al. .......... 374/178 |
| 6,679,628 B1 * | 1/2004 | Breinlinger ................... 374/178 |
| 6,808,307 B1 * | 10/2004 | Aslan et al. ................. 374/178 |
| 2004/0062293 A1 * | 4/2004 | Breinlinger ................... 374/178 |

OTHER PUBLICATIONS

Tuthill, Mike, "A Switched-Current, Switched-Capacitor Temperature Sensor in 0.6-.mu.m CMOS," IEEE Journal of Solid State Circuits, vol. 33, No. 7, Jul. 1998, pp. 1117-1122.*

Kanoun, O.; "Measuring Temperature Calibration Free with Bipolar Transistors, " IEEE (1998), pp. VI-617-VI-620 (no month).*

"On Chip Temperature Sensor," TDB-ACC-No. NN9308489, IBM Technical Disclosure Bulletin, vol. 36, No. 8, (Aug. 1993).*

Pertijs, Meijer and Huijsing; "Non-Idealities of Temperature Sensors using Substrate PNP Transistors", IEEE (2002) (no month), pp. 1018-1023.*

* cited by examiner

*Primary Examiner*—G. Bradley Bennett
(74) *Attorney, Agent, or Firm*—W. James Brady, III; Frederick J. Telecky, Jr.I

(57) ABSTRACT

The temperature of an internally or remotely sensed diode is determined using sequential currents applied to the diode, while compensating for parasitic resistance effects on the sensed diode so that the temperature indication is accurate. A method or circuit is provided which isolates the parasitic resistance value itself or a voltage representative of the parasitic resistance, so that an error compensation value can be obtained for use in subsequent measurements.

15 Claims, 2 Drawing Sheets

REMOTE DIODE TEMPERATURE SENSE METHOD WITH PARASITIC RESISTANCE CANCELLATION

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates to methods and circuitry for measuring the temperature of an integrated circuit (IC).

In various contexts, the temperature of a given IC (otherwise referred to as a "chip") may be measured by sensing the temperature at a temperature sensing pn junction within the IC. The IC may, e.g., be a personal computer (PC) processor chip, the temperature of which is controlled by operating a fan. The junction may be a diode or part of a bipolar transistor.

Some ICs are sensed externally or remotely, and thus have external terminals for coupling an internal temperature sense pn junction to a remote temperature sensing circuit. Other ICs are sensed internally, and thus have an on-chip temperature sensing circuit coupled directly to the IC's temperature sense pn junction.

There are a number of ways to determine the temperature of a pn junction, whether the junction is sensed internally or externally. One known method involves sequentially applying two different DC currents to the pn junction, and measuring the voltage across the pn junction, for the respective currents. The difference between the voltage values is then determined, which is used to determine the temperature of the sensed diode.

This known two current sequence method described above may provide inaccurate results, because it fails to adequately compensate for a parasitic resistance that develops across the sensed diode. Such a parasitic resistance may include the internal resistance of the sensed diode device as well as resistance associated with paths connecting the sensing circuit to the sensed diode.

SUMMARY OF THE INVENTION

A method and apparatus are provided to determine the temperature of an internally or remotely sensed diode using sequential currents applied to the diode, while compensating for parasitic resistance effects on the sensed diode so that a more accurate temperature indication is achieved. In accordance with one aspect of the invention, a circuit is provided which isolates a parasitic resistance value or a voltage representative of the parasitic resistance, to obtain an error compensation value (otherwise referred to herein as an offset correction value) for use in subsequent measurements.

BRIEF DESCRIPTION OF THE DRAWINGS

The invention will be more fully understood with reference to the following Detailed Description of the Invention in conjunction with the drawings, of which.

DETAILED DESCRIPTION

Figure 1:
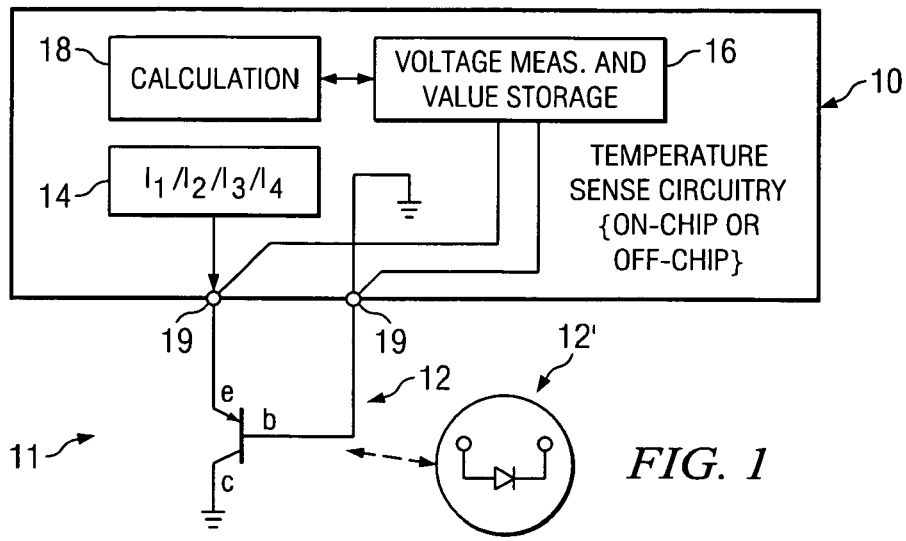
FIG. 1 is an embodiment of a schematic diagram of temperature sense circuitry according to an embodiment of the invention connected to a temperature sensing pn junction.

FIG. 1 shows a temperature measuring circuit 11, comprising temperature sense circuitry 10 connected to a temperature sensing device (having a temperature sense pn junction), illustrated in FIG. 1 as either a bipolar junction transistor 12 or a diode 12'. As illustrated, bipolar junction transistor 12 comprises an emitter (e), a base (b), and a collector (c). Diode 12' may comprise a semiconductor diode or a Schottky diode.

The illustrated circuitry facilitates the measurement of temperature at the pn junction by measuring signals at the pn junction. In the case of a Schottky or semiconductor diode 12', the signals measured are the current through the diode and the resulting forward-bias voltage. In the case of a bipolar junction transistor 12, the signals measured comprise the collector current and the resulting base-emitter voltage. The temperature measurement may be utilized to measure the temperature of an integrated circuit (IC). For example, the IC may be a personal computer (PC) processor chip.

The illustrated temperature sense circuitry 10 comprises a current forcing circuit 14, a voltage measurement and value storage circuit 16, and a calculation circuit 18. Current forcing circuit 14 comprises, in the illustrated embodiment, multiple or selectable current sources, or a variable current source, so as to be able to force first, second, third, and fourth sequential currents ($I_1$, $I_2$, $I_3$, and $I_4$) to the temperature sense pn junction. The illustrated voltage measurement and value storage circuit may comprise, for example, capacitors to store charge representative of the amplified sequential voltages differences across the pn junction when the first, second, third, and fourth sequential currents are forced to the pn junction. Calculation circuit 18 may comprise a digital circuit, for example, a processor or controller, to perform calculations to determine a parasitic signal component corresponding to a parasitic resistance of the pn junction, to determine a temperature indicative value. Calculation circuit 18 further determines a corrected temperature indicative value by subtracting the parasitic signal component from the temperature indicative value.

Temperature sense circuitry 10 may comprise circuitry that is either integrated on the chip with the sense junction being measured, or off the chip being measured. For example, in an off-chip version, the chip being measured may have a pair of terminals coupled to the temperature sense junction device, and temperature sense circuit 10 may include a pair of conductive leads 19 coupled to that pair of terminals. In an on-chip version, the connection to the illustrated pair of conductive leads 19 of the junction temperature sense device will be direct, and the various circuit elements of temperature sense circuitry 10 will be part of the integrated circuit.

The pn junction device 12 or 12' exhibits a "diode" proportional-to-temperature behavior, in accordance with the following simplified diode equation:

$$V = ((nkT)/(q))ln(I_D)/(I_s)$$

where n equals an ideality factor (which is a characteristic of the temperature sense diode); k is Boltzman's constant; q is a charge of one electron ($1.6e^{-19}$ Coulombs); $I_s$ is the saturation current; and $I_D$ is the diode current (or the collector current, when the device is a bipolar transistor).

For a ratio N representing the ratio of the respective values (the DC amplitude) of a first current $I_{D1}$ and a multiple of that current $NI_{D1}$ the following equation will be applicable:

$$V = \frac{nkT}{q}\ln\frac{NI_{c_1}}{I_{c_1}}$$

$$\Delta V_{ideal} = \frac{nkT}{q}\ln\frac{NI_{D1}}{I_S} - \frac{nkT}{q}\ln\frac{I_{D1}}{I_S} = \frac{nkT}{q}\ln N$$

if parasitic resistance is included:

$$\Delta V = \frac{nkT}{q}\ln\frac{NI_{D1}}{I_S} + NI_{D1}*R_{PAR} - \left(\frac{nkT}{q}\ln\frac{I_{D1}}{I_S} + I_{D1}*R_{PAR}\right)$$

$$= \frac{nkT}{q}\ln N + (N-1)*I_{D1}*R_{PAR}$$

the last term will be noted as the parasitic term:

$$V_P = (N-1)*I_{D1}*R_{PAR}$$

Accordingly, a conversion factor equation is applicable for determining the temperature (T) based upon the change in voltage $\Delta V$, as follows for example case N=17:

$$\text{For } N = 17 \Rightarrow \frac{\Delta V}{T} = \frac{nk}{q}\ln(17) = 244.1\frac{\mu V}{°C}*n$$

| Temperature | $N = 17, n = 1$ Absolute input refered differential signal $\Delta V$ |
|---|---|
| −50° | +54.5 mV |
| 0°C | +66.7 mV |
| +128°C | +97.9 mV |

And for $N = 17 \Rightarrow V_P = 16*I_{D1}*R_{PAR}$

In accordance with the above table, the voltage $\Delta V$ can be used to represent the sensed temperature.

Figure 2:
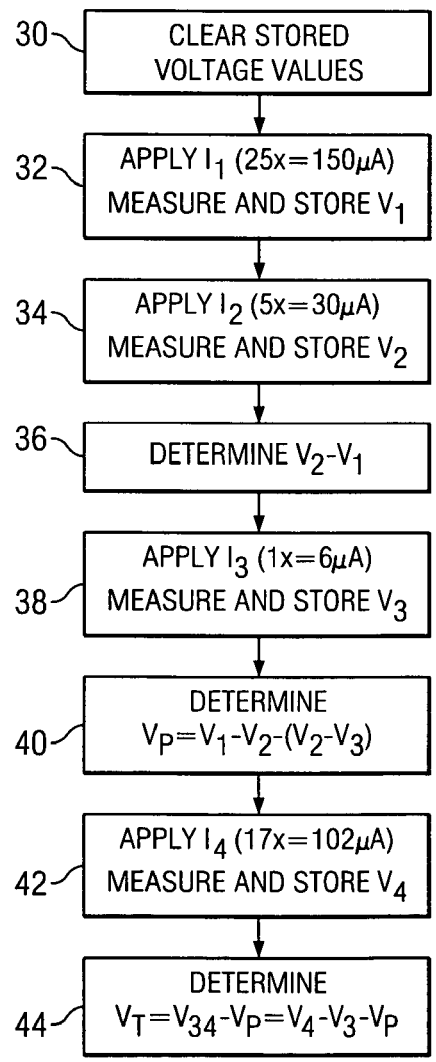
FIG. 2 is a flow chart of a temperature determination process by which according to an embodiment of the invention the circuit illustrated in FIG. 1 determines an error compensated temperature value, including a calibration process.

FIG. 2 illustrates a process of calibrating a temperature sensing process. As noted above, the temperature of an internal or remote sensed diode is determined using sequential currents applied to the diode, while compensating for parasitic resistance effects on the sensed diode so that the temperature indication is accurate. The calibration process is provided to determine a compensation value to compensate for the parasitic resistance effects. Specifically, the process isolates the parasitic resistance value itself, or a voltage representative of the parasitic resistance, so that an error compensation value can be obtained for use in subsequent measurements. Such a value may be otherwise referred to as an offset correction value.

As shown in FIG. 2, at a first step 30, stored voltage values stored in voltage measurement and value storage circuit 16 are cleared. At step 32, a first current $I_1$ is forced to the temperature sense pn junction. A resulting pn junction voltage $V_1$ is measured and stored. In step 34, a second current $I_2 = I_1/M$ is forced to the temperature sense pn junction. A resulting pn junction voltage $V_2$ is measured and stored at that step. Then, at step 36, a determination is made regarding the change in voltage, i.e., $V_2-V_1$. In step 38, a third current $I_3 = I_2/M$ is forced, and a resulting pn junction voltage $V_3$ is measured and stored. In step 40, a determination is then made of $-V_P$ (the negative of the parasitic voltage component), which equals $V_1-V_2-(V_2-V_3)$. Because $I1/I2=I2/I3=M$, $-V_P$ represents a voltage across the sensed junction terminals that is a function of the parasitic resistance separate from the voltage component associated with the pure natural log behavior of the ideal junction.

In step 42, a fourth current $I_4 = I_1 - 2*I_2 + I_3 = (M^2-2M+1)*I_3$, where $(M^2-2M+1)=N$, is forced to the temperature sense pn junction, and the resulting voltage $V_4$ is measured and stored. A determination is then made at step 44 of the voltage which is indicative of the temperature of the pn junction, compensated for by using the parasitic voltage component, so as to get an error compensated temperature indicative value $V_T$. That is calculated by subtracting the parasitic component voltage $V_P$ from the difference in voltage between the fourth voltage $V_4$ and the third voltage $V_3$.

In the illustrated embodiment, M=5, the first current $I_1$ is 25 times a unit value of the current, referred to as x in FIG. 2. In the specific embodiment, the first current is 150 μA. The second current $I_2$ is 5x, which in the illustrated embodiment is 30 μA. The third current I3 is 1x, which in the illustrated embodiment is 6 μA. The fourth current is 17x, which in the illustrated embodiment is 102 μA.

Figure 3:
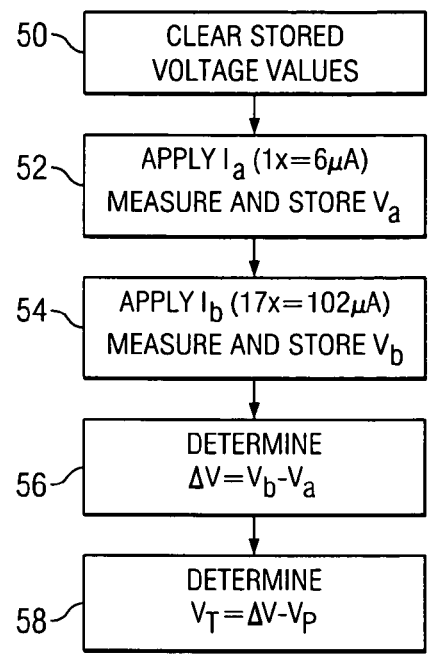
FIG. 3 is a flow chart of a temperature determination process without the step of calibration; and using the previously determined stored calibration correction.

Once the parasitic component voltage is determined, using the calibration part of the process as shown in FIG. 2, it may be used as an error correction value in connection with a pair of sequential currents to determine the temperature of the temperature sense pn junction. This continuous sensing mode part of the process is shown in FIG. 3. Because the environment and certain physical limitations of the temperature sense pn junction may introduce variations in the parasitic component, it may be beneficial to continue a four step process as shown in FIG. 2, without entering into a separate two step continuous sensing mode as shown in FIG. 3. Specifically, every time the temperature is sensed, a new parasitic component value can be determined at step 40 as shown in FIG. 2, rather than relying upon that value for subsequent measurements using the process shown in FIG. 3. However, to provide a more efficient temperature sensing process which requires less cycles, the continuous sensing mode may be utilized as shown in FIG. 3.

In a first step 50 in FIG. 3, the stored voltage values stored in voltage measurement and value storage circuit 16 are cleared. In a next step 52, a first current $I_a$ is applied to the temperature sense pn junction, and the resulting voltage $V_a$ is measured and stored. In a next step 54, a second current $I_b$ is applied, and the resulting voltage $V_b$ is measured and stored. A determination is then made at step 56 of the temperature indicative value, $\Delta V$ which equals $V_b-V_a$. Then, in step 58, the error compensated temperature value $V_T$ is determined, which equals $\Delta V-V_P$. $V_P$ is obtained in the calibration process shown in FIG. 2.

The temperature sensing process in the continuous sensing mode of FIG. 3 includes a first current $I_a$ and a second current $I_b$. The first current $I_a$ is 1x, which in the illustrated embodiment is 6 μA. The second current $I_b$ is 17x, which in the embodiment is 102 μA.

Figure 4:
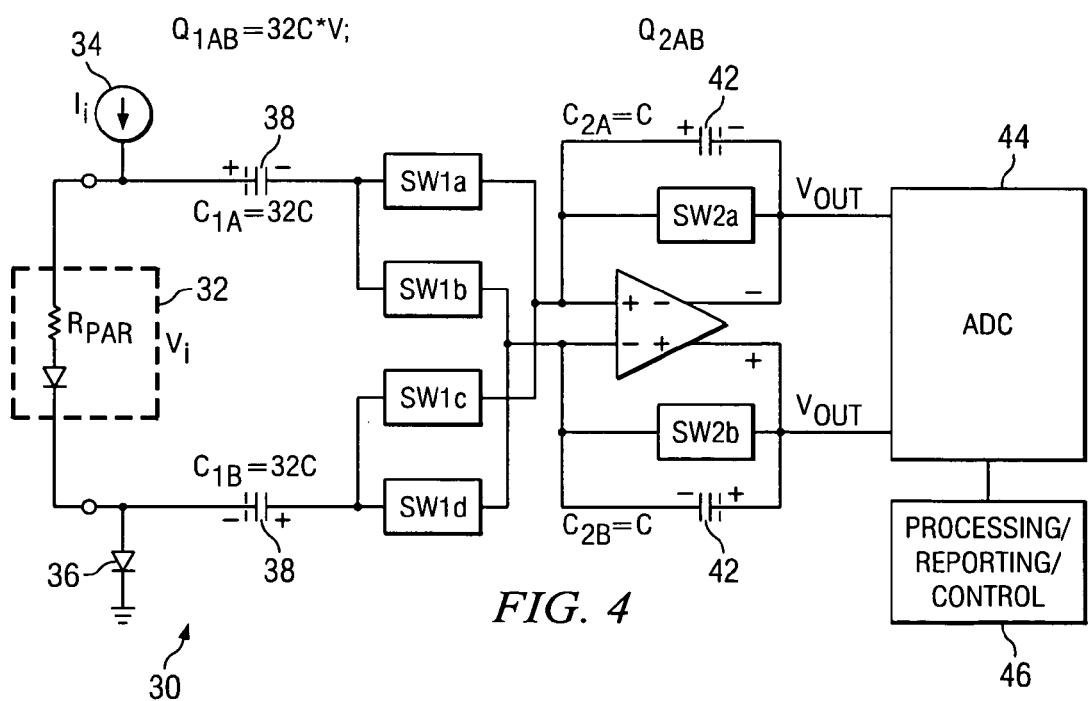
FIG. 4 is a more detailed schematic diagram of an embodiment of the temperature sense circuitry.

FIG. 4 is a simplified schematic diagram of a circuit for implementing the calculations in accordance with the processes shown in FIGS. 2 and 3. Consistent with the processes shown in FIGS. 2 and 3, the circuit shown in FIG. 4 may be configured, with the control of its various switches, to be in one of six different modes of operation, represented by the capital letters A–F.

The following Table outlines these modes of operation:

| | $SW1_a$ | $SW1_b$ | $SW1_c$ | $SW1_d$ | $SW2_a$ | $SW2_b$ | Vi | $I_i$ | $Q_{2AB}$ | Vout |
|---|---|---|---|---|---|---|---|---|---|---|
| A<br>Clear Stored Voltages | C | O | O | C | C | C | $V_1$ | $I_1 = 25\times$ | 0 | 0 |
| B<br>Parasitic Component Det. - part 1 | C | O | O | C | O | O | $V_2$ | $I_2 = 5\times$ | $32C(V_2 - V_1)$ | $32(V_2 - V_1)$ |
| C<br>Parasitic Component Det. - part 2 | O | C | C | O | O | O | $V_3$ | $I_3 = 1\times$ | $32C(V_2 - V_1 - V_3 + V_2)$ | $32(V_2 - V_1 - V_3 + V_2)$ |
| D<br>Determine V+ | C | O | O | C | O | O | $V_4$ | $I_4 = 17\times$ | $32C(V_2 - V_1 - V_3 + V_2 + V_4 - V_3)$ | $32(V_2 - V_1 - V_3 + V_2 + V_4 - V_3)$ |
| E<br>Clear Stored Voltages | C | O | O | C | C | C | $V_a$ | $I_a = 1\times$ | 0 | 0 |
| F<br>Determine ΔV | C | O | O | C | O | O | $V_b$ | $I_b = 17\times$ | $32C(V_b - V_a)$ | $32(V_b - V_a)$ |

As illustrated in FIG. 4, the illustrated temperature sense circuitry 30 comprises a temperature sense pn junction device 32 (having a diode component and a parasitic resistance $R_{par}$), a current source 34, and a rectifier circuit, shown as a diode 36. The terminals of temperature sense pn junction device 32 are respectively coupled to capacitors 38, including a top capacitor $C_{1A}$ and a lower capacitor $C_{1B}$. Capacitors 38 are connected to a switch cap differential amplifier 40 via switches SW1a, SW1b, SW1c, and SW1d.

Switch SW1a is connected between the negative terminal of capacitor $C_{1A}$ and the positive input terminal of amplifier 40. Switch SW1b is connected between the negative terminal of capacitor $C_{1A}$ and the negative terminal of amplifier 40. Switch SW1c is connected between the positive terminal of capacitor $C_{1B}$ and the positive input terminal of amplifier 40. Switch SW1d is connected between the positive terminal of the lower capacitor $C_{1B}$ and the negative input terminal of amplifier 40.

A second pair of capacitors 42 is also provided, which include an upper capacitor $C_{2A}$ and a lower capacitor $C_{2B}$. Upper capacitor $C_{2A}$ is connected between the positive input terminal and the negative output terminal of amplifier 40. Lower capacitor $C_{2B}$ is connected between the negative input terminal and the positive output terminal of amplifier 40. A pair of switches is provided corresponding to each of the upper and lower capacitors $C_{2A}$ and $C_{2B}$. The upper switch is switch SW2a and the lower switch is switch SW2b. Switch SW2a is connected across the positive and negative terminals of capacitor $C_{2A}$. Switch SW2b is connected across the negative and positive terminals of the lower capacitor $C_{2B}$. The output voltage of circuit 30 is measured across the output terminals of amplifier 40. An analog to digital converter (ADC) 44 receives the voltage $V_{out}$, and outputs a digital signal to an input of a circuit 46 for processing, reporting, and/or control.

Processing/reporting/control circuit 46 may comprise a controller, a processor, and/or any reporting circuit for acting on the temperature information provided by temperature sense circuitry 30.

In operation (referring to the above Table), in a first mode A, switches SW1a, SW1d, SW2a and SW2b are all closed, while switches SW1b and SW1c are open. The voltage $V_i$ across temperature sense pn junction device 32 is $V_1$. The current applied to temperature sense pn junction device 32 is $I_1$, which is $25 \times I_{unit}$. The total charge (Q) on capacitors $C_{2A}$ and $C_{2B}$, i.e., $Q_{2AB}$, is zero, and the output voltage $V_{out}$ is zero volts (assuming ideal opamp 40 i.e. vos=0Aol=∞).

By closing switches SW2a, and SW2, the voltage values stored by capacitors 42 are cleared. Mode A carries out steps 30 and 32 of the temperature sensing process shown in FIG. 2.

Mode B in sequence opens SW2a and SW2b, and forces current I2. This carries out steps 34 and 36 of the process shown in FIG. 2. Switches SW1a and SW1d remain closed and the remaining switches are all open. The voltage across the temperature sense pn junction device 32 is $V_2$, and $Q_{2AB}$ is $32C(V_2-V_1)$. Therefore, $V_{out}$ is $32(V_2-V_1)$. Accordingly, as noted at step 36 in FIG. 2, the voltage difference $V_2-V_1$ has been directly stored by the operation of the switches and storage of the resulting values within the capacitors 42.

Mode C carries out steps 38 and 40 of the process shown in FIG. 2. In sequence, SW1a and SW1d are opened and Switches SW1b and SW1c are closed, while the remaining switches are open. Current $I_3 = 1 \times I_{unit}$ is then forced on the temperature sense junction. The voltage across the temperature sense pn junction device 32 is $V_3$. The voltage $V_3$ is now stored in capacitors 38. And the charge stored on capacitors 42 is $Q_{2AB} = 32C(V_2-V_1-V_3+V_2)$. Accordingly, the output $V_{out}$ is $32(V_2-V_1-V_3+V_2)$ or $-32*Vp$.

In mode D, the illustrated circuit of FIG. 4 carries out steps 42 and 44 of the process shown in FIG. 2, resulting in a determination of the compensated temperature indicative voltage value $V_T$, at $V_{out}$. In sequence SW1b and SW1c are opened, then SW1a and SW1d are closed, while all remaining switches are open. The voltage across temperature sense pn junction device 32 is captured in capacitors 38, which is $V_4$. The applied current $I_4$ equals $17 \times I_{unit}$. $Q_{2AB}$ is equal to $32C(V_2-V_1-V_3+V_2+V_4-V_3)$. The parasitic component voltage $V_P$ was determined in mode C, and at step 40 of the process shown in FIG. 2. This value is represented in the part of the expression representing the signal $Q_{2AB}$ or $Q_{2AB}=32C$ $(-V_p+V_4-V_3)$. This equation, shown in step 44 of the process in FIG. 2, is further represented by the output voltage $V_{out}=32(V_2-V_1-V_3+V_2+V_4V_3)$ or $V_{out}=(-V_P+V_4-V_3)$. Expressing $V_{43}=V_4-V_3$ in terms of the sequential diode equation.

$$V_4 - V_3 = \frac{nkT}{q}\ln 17 + (17-1)*I_3*R_{PAR} = \frac{nkT}{q}\ln 17 + V_P$$

Substituting back into $V_4-V_3$ back into the Vout equation.

$$V_{out} = 32\left(-V_P + \frac{nkT}{q}\ln 17 + V_P\right) = 32\left(\frac{nkT}{q}\ln 17\right)$$

Dependent on temperature and independent of $R_{par}$.

Alternatively with advantage of a faster sampling rate, a single calibration is measured at mode C by the ADC of the above method.

The parasitic component compensation($-32*V_P$) of the output voltage was determined as shown in FIG. 2, at mode C, circuit 30 may now operate in a continuous sensing mode, as illustrated by modes E and F.

Mode E involves clearing of stored voltages, which corresponds to step 50 of the process shown in FIG. 3. In this mode, switches SW1a, SW1d, SW2a, SW2b are all closed, while switches SW1b and SW1c are open. This causes the signals at $Q_{2AB}$ and $V_{out}$ to be zero. In this case, the current applied is $I_a$, which equals 1x, and the resulting voltage across temperature sense pn junction device 32 is $V_a$. In the next mode F, a change in voltage across the temperature sense pn junction device 32 is determined, i.e., $V_b-V_a$. In this mode, switches SW1a and SW1d remain closed, while all remaining switches are open. Sequentially SW2a and SW2b are opened and the current $I_b$ is forced, which equals 17x, causing a resulting voltage Vb to be formed across temperature sense pn junction device 32. The resulting signal at $Q_{2AB}$ is $C(V_b-V_a)$. The voltage at $V_{out}$ is $32(V_b-V_a)$. If a measurement of this $V_{out}$ is digitally summed with the previous measurement at mode C, the result is a digitally compensated result equal to the parasitic free result of mode D.

Those of ordinary skill in the art will recognize that modifications to and variations of the above-descirbed features may be made without departing from the inventive concepts disclosed herein. Accordingly, the invention should not be viewed as limited except as by the scope and spirit of the appended claims.

What is claimed is:

1. A method for measuring temperature by measuring signals at a pn junction, the method comprising:
    applying a first current across the pn junction;
    applying a second current across the pn junction;
    determining a first change value based upon a change in forward voltage across the pn junction due to the first current and the second current;
    isolating a parasitic resistance component as a function of the first change value;
    applying another current across the pn junction and measuring a temperature indicative value based upon the voltage across the pn junction when applying the another current; and
    subtracting from the temperature indicative value an offset value based on the isolated parasitic resistance component, to produce an error compensated temperature value.

2. The method according to claim 1, comprising measuring the temperature of an integrated circuit (IC) containing the pn junction.

3. The method according to claim 1, wherein the pn junction is part of a Schottky diode, and wherein the signals measured at the pn junction comprise a current through the diode and a forward-bias voltage across the diode resulting from the current.

4. The method according to claim 1, wherein the pn junction is a junction of a bipolar junction transistor, and wherein the measured signals comprise a collector current of the bipolar junction transistor and a base-emitter voltage resulting from the collector current.

5. The method according to claim 1, wherein the isolating of a parasitic resistance component from the first change value comprises applying a third current across the pn junction, determining a second change value based upon a change in forward voltage across the pn junction due to the second current and the third current, and subtracting the second change value from the first change value, and wherein the another current is a fourth current.

6. The method according to claim 5, wherein the magnitude of the third current is 1unit, and wherein the magnitude of the fourth current is N (1unit), where N=M*M−2M+1.

7. The method according to claim 5, wherein the offset value is equal to the isolated parasitic resistance component.

8. The method according to claim 1, wherein the offset value is equal to the isolated parasitic resistance component.

9. A method for measuring temperature of an integrated circuit (IC) comprising measuring signals at a pn junction of the IC, the method further comprising:
    determining an offset value based on a parasitic resistance component of a temperature indicative voltage difference; and
    periodically applying a pair of sequential currents to the pn junction and ascertaining a temperature indicative value based upon the temperature indicative voltage difference between one voltage across the pn junction when one current of the pair is applied to the pn junction and another voltage across the pn junction when another current of the pair is applied to the pn junction.

10. The method according to claim 9, wherein the pn junction comprises a pn junction of a Schottky diode, and wherein the signals measured comprise a current through the pn junction and a forward-bias voltage across the pn junction resulting from the current.

11. The method according to claim 9, wherein the pn junction comprises a pn junction of a bipolar junction transistor, and wherein the signals measured comprise a collector current and a base-emitter voltage resulting from the collector current.

12. Apparatus for measuring temperature by measuring signals at a pn junction, the apparatus comprising:
    a current application circuit to apply first, second, third, and fourth sequential currents to the pn junction;
    a voltage measurement and value storage circuit to measure voltages across the pn junction when the first, second, third, and fourth sequential currents are applied to the pn junction, and to store values representing the resulting voltages; and
    a calculation circuit to perform calculations to determine a parasitic signal component corresponding to a parasitic resistance of the pn junction, to determine a temperature indicative value and to determine a corrected temperature indicative value by subtracting the parasitic signal component from the temperature indicative value.

13. The apparatus according to claim 12, wherein the temperature being measured is of an integrated circuit (IC).

14. The apparatus according to claim 13, comprising the pn junction, the junction being part of a Schottky diode, the signals being measured comprising a current through the Schottky diode and a forward-biased voltage across the pn junction of the Schottky diode as a result of the current through the Schottky diode.

15. The apparatus according to claim 13, comprising the pn junction, the pn junction being part of a bipolar junction transistor, the signals being measured comprising a collector current of the bipolar junction transistor, and a base-emitter voltage resulting from the collector current.

* * * * *